US009395003B2

(12) United States Patent
Hayafuji et al.

(10) Patent No.: US 9,395,003 B2
(45) Date of Patent: Jul. 19, 2016

(54) PROCESS AND DEVICE FOR REDUCING RADIOACTIVE MATERIAL OF OBJECT CONTAINING RADIOACTIVE MATERIAL TO SAFE LEVEL IN LIVING ENVIRONMENT

(75) Inventors: Shigeto Hayafuji, Tokyo (JP); Takeshi Kamaya, Yachiyo (JP); Hiroshi Hayakawa, Chiba (JP); Yasuhiro Jinbo, Chigasaki (JP); Kaname Mogami, Tokyo (JP); Kenji Takeshita, Tokyo (JP); Masanori Aritomi, Tokyo (JP); Kunio Yoshikawa, Tokyo (JP); Saburo Kikuchi, Nagareyama (JP); Akio Ishido, Yokohama (JP)

(73) Assignees: CDM CONSULTING CO., LTD., Tokyo (JP); RADWASTE AND DECOMMISSIONING CENTER, Tokyo (JP)

( * ) Notice: Subject to any disclaimer, the term of this patent is extended or adjusted under 35 U.S.C. 154(b) by 172 days.

(21) Appl. No.: 14/236,884

(22) PCT Filed: Aug. 3, 2012

(86) PCT No.: PCT/JP2012/069901
§ 371 (c)(1),
(2), (4) Date: Apr. 14, 2014

(87) PCT Pub. No.: WO2013/021954
PCT Pub. Date: Feb. 14, 2013

(65) Prior Publication Data
US 2014/0228612 A1    Aug. 14, 2014

(30) Foreign Application Priority Data

| Aug. 5, 2011 | (JP) | 2011-172430 |
|---|---|---|
| Aug. 22, 2011 | (JP) | 2011-180990 |
| Oct. 13, 2011 | (JP) | 2011-225812 |
| Feb. 29, 2012 | (JP) | 2012-042988 |
| Mar. 2, 2012 | (JP) | 2012-046624 |
| Mar. 13, 2012 | (JP) | 2012-056320 |
| Jun. 11, 2012 | (JP) | 2012-132203 |
| Jun. 11, 2012 | (JP) | 2012-132208 |

(51) Int. Cl.
| A62D 3/35 | (2007.01) |
| F16K 5/06 | (2006.01) |
| G21F 9/28 | (2006.01) |
| G21F 9/30 | (2006.01) |

(52) U.S. Cl.
CPC ... *F16K 5/06* (2013.01); *G21F 9/28* (2013.01); *G21F 9/30* (2013.01)

(58) Field of Classification Search
CPC .............. A62D 3/35; G21F 9/20; G21F 9/14
USPC .................. 588/20, 18, 19, 321, 410, 412
See application file for complete search history.

(56) References Cited

U.S. PATENT DOCUMENTS

| 4,808,316 A | 2/1989 | Otomura et al. |
| 2008/0181835 A1 | 7/2008 | Mason |

FOREIGN PATENT DOCUMENTS

| CN | 1208938 A | 2/1999 |
| EP | 1 927 997 A1 | 6/2008 |
| GB | 1163099 | 9/1969 |
| JP | 62-191800 A | 8/1987 |
| JP | 10-1315 A | 1/1998 |
| JP | H 10-296209 A | 11/1998 |
| JP | 2003-103299 A | 4/2003 |
| JP | 2005-199209 A | 7/2005 |
| JP | 2006-88056 A | 4/2006 |
| JP | 2008-116275 A | 5/2008 |
| JP | 2009-162646 A | 7/2009 |
| JP | 2010-107450 A | 5/2010 |

OTHER PUBLICATIONS

Chinese Office Action dated Aug. 5, 2015 with an English translation thereof.
International Search report in PCT/JP2012/069901 dated Aug. 28, 2012.
Japanese Office Action dated Nov. 25, 2014 with an English translation thereof.
Mainichi Shimbun, "Purification of cesium contaminated water with pigment, developed by Tokyo Institute of Technology," Apr. 15, 2011, Mainichi Newspapers Co., Ltd.
"This is the way to revive Fukushima soil; Food safety; JBpress," [online] [Searched on Sep. 20, 2011] Internet <URL:http://jbpress.ismedia.jp/articles/-/5920>.
Masanori Arita, "Doc:Radiation/Clay Minerals," [online], [Searched on Sep. 20, 2011], Internet <URL;http://metabolomics.jp/wiki/Doc:Radiation/Clay Minerals>.
Nihon Keizai Shimbun, "Utilization of algae for purification with algae "binos" for purifying radioactive-material contaminated water," Jul. 15, 2011, Morning edition from Nikkei Inc.
"Nihon Keizai Shimbun" dated Sep. 5, 2011 "Academic, business, and governmental circles try their ingenuity at solving atomic-power accident in Fukushima in the field of decontamination technique" [online], [Searched on Apr. 7, 2014], Internet <URL:http//www.nikkei.com/article/DGXDASGG0300A_U1A900C1TJM000/>.

(Continued)

*Primary Examiner* — Edward Johnson
(74) *Attorney, Agent, or Firm* — McGinn IP Law Group PLLC

(57) ABSTRACT

A process for reducing a radioactive material of an object containing a radioactive material to a safe level in a living environment includes releasing pressure including carrying out a heating process on an aqueous liquid that includes water, water-soluble liquid, or a mixture of water and water-soluble liquid, and the object in a state where temperature is less than or equal to a critical temperature of the aqueous liquid and pressure is greater than or equal to a saturated vapor pressure of the aqueous liquid when the object is immersed in the aqueous liquid to such a degree that the object is covered or to a greater degree and then abruptly releasing the pressure, and separating, after the releasing pressure, the mixture of the object and the aqueous liquid into liquid and solid.

19 Claims, 5 Drawing Sheets

(56) References Cited

OTHER PUBLICATIONS

"Agriculture, Forestry and Fisheries Research Council" press release dated Sep. 16, 2011, "Concerning determination on emergency response project of radio active material" [online], [Searched on Apr. 8, 2014], Internet<URL:http://www.s.affrc.go.jp/docs/press/110916.htm>.

"Society of Chemical Engineers, Japan" the $77_{th}$ annual conference Mar. 15-17, 2012 "Cesium recovery from soil by means of complex process of aqueous pyrolysis and coagulating sedimentation" [online], [Searched on Apr. 14, 2014], Internet <URL:http//www3.scej.org/meeting/77a/>.

Emergency response project: Practical technology development work to accelerate new policy by "Ministry of Agriculture, Forestry and Fisheries" in the year 2011 "Experimental study of radioactive cesium separation cleaning technique from agricultural land using steam/blasting reaction (project No. 23066)" [online], [Searched on May 21, 2012], Internet<URL:http://www.s.affrc.go.jp/docs/nogyo_gizyutu/pdf/2_2.pdf—May 25, 2012 >.

"The Japan Agricultural News" dated Jan. 5, 2012 "Cesium separation by water. Decontaminated soil is recoverable. Technological development by collaboration with industries and universities."

Extended European Search Report dated May 19, 2015.

International Search report in PCT/JP2012/069901 dated Aug. 8, 2012.

PROCESS AND DEVICE FOR REDUCING RADIOACTIVE MATERIAL OF OBJECT CONTAINING RADIOACTIVE MATERIAL TO SAFE LEVEL IN LIVING ENVIRONMENT

TECHNICAL FIELD REDUCING

The present invention relates to a process and device for reducing a radioactive material of an object containing the radioactive material to a safe level in a living environment.

BACKGROUND ART

Nuclear power generation and atomic bomb, which uses a solid nuclear fuel, are dependent on a fission reaction in which nuclei of uranium-235 or plutonium-239 are artificially destroyed. During this process, the nuclei of uranium-235 or plutonium-239 are split into two or more nuclear transformation product (nuclides or elements), and energy is generated at that time. A process of slowly carrying out the fission under control is power generation, while a process of releasing instantly is used for a bomb. A plurality of nuclides resulting from the fission (fission products) generally lacks a balance between the number of protons and the number of neutrons; the nuclides therefore become radionuclides having radioactivity. The form of those radionuclides (gas/liquid/solid) and the intensity of radioactivity vary according to the type of the nuclide. The radionuclides eventually become other stable nuclides with no radioactivity as the radionuclides release radiation; the time required for that process, however, varies greatly according to the type of the nuclide. The amount of time required for a nuclide to lose half the radioactivity thereof is referred to as the half-life of the nuclide. The level of radioactivity of a nuclide with a short half-life is high. Radioactive krypton and radioactive xenon, which are fission products, are gases at room temperature. Radioactive cloud mainly consisting of the above substances emit intense radiation around when moving. However, after the radioactive cloud passed and went away, there is no radioactivity left. The half-life of gaseous radioactive iodine is eight days, and therefore almost all of the gaseous radioactive iodine will disappear in a half year.

Radioactive cesium turns to gas at 678 degrees Celsius. Therefore, a nuclear accident likely would entail the release of radioactive cesium, which easily spreads widely in the environment. Moreover, the half-life of the cesium is long, i.e. 30 years. And furthermore, cesium can easily bind to soil particles, and therefore does not flow away from the earth's surface for a long time. Accordingly, cesium remains even after a radionuclide with a short half-life and radioactive iodine disappear; cesium continues to emit radiation from the earth's surface, and is absorbed into agricultural products, thereby causing long-term exposure. By the late 1960s, atmospheric nuclear tests released large quantities of fission products, or 105 million times 10 quadrillion becquerels, and contamination spread all over the globe. Radioactive cesium generated by nuclear tests still remain in the ocean, on the earth's surface, and in the atmosphere. The Chernobyl nuclear accident left a scattering of heavily contaminated areas in a range with a diameter of about 250 km. After the Fukushima nuclear accident, radioactive cesium was detected even from tea leaves in Shizuoka Prefecture, which is far away from the nuclear plant.

The half-life of radioactive strontium is 28 years, posing the same problems as radioactive cesium. However, radioactive strontium is released in atomic bomb tests or accidents at nuclear power plants, in which a reactor core is completely destroyed as in the case of the Chernobyl nuclear accident. Therefore, the spread of radioactive strontium in the environment is limited compared with radioactive cesium. Therefore, in view of radioactive-material contamination of the environment, it is very important to take measures against radioactive cesium.

A known method of removing awkward radioactive cesium, from a substance in the environment that is contaminated with it and putting together it into a particular area, is a process comprising the steps of putting, in water, a substance with a surface to which radioactive cesium in the environment is attaching, dissolving the water-soluble radioactive cesium in water, and dissolving ferrocyanide, such as iron ferrocyanide or nickel ferrocyanide, in the water, thereby allowing the radioactive cesium in the water to be adsorbed onto the ferrocyanide (Non-Patent Document 1).

According to this process, soil is dispersed in water, and radioactive cesium attaching to the surface of the soil is therefore dissolved in the water. However, this process is not sufficient. The reason, though relatively well known, is that radioactive cesium is easily captured by clay minerals in the soil. By making use of this property, even tentative attempts have been made to use clay to clean the environment contaminated with radioactive material. In other words, once radioactive cesium gets into clay, the radioactive cesium cannot be easily removed. Among various kinds of clay, if cesium is adsorbed into a mineral called illite, which is one type of mica, the cesium may not be utilized by plants and be fixed to the soil (Non-Patent Documents 2, 3); one possible reason is that cesium ions are unlikely to come out of a layer of illite as the cesium ions are caught in the layer. If cesium is unlikely to move from soil to plants, cesium is also unlikely to move to plants that people eat, helping reduce the problems. If plants have enough potassium, it is difficult for the plants to absorb cesium. It is known that, if plants do not have enough potassium, the plants can alternatively capture cesium. It is unclear whether this phenomenon is also applied to clay. If that is the case, keeping excessive amounts of potassium fertilizer at all times is actually difficult because the potassium fertilizer is expensive. Moreover under a high concentration of cesium, it is hard to do farm work. Furthermore, consumers may not feel comfortable buying farm products produced from the land where the amount of cesium is not at an inconsiderable level. In the first place, clay is an essential soil component in rice-farming soil to keep water. Even if a surface layer of the contaminated land is removed and replaced with non-contaminated soil, the problem remains as to how to deal with large quantities of contaminated soil. Therefore if cesium adsorbed into clay cannot be removed, rice farming will be significantly affected.

There is a well-known method of removing the radioactive material, from soil contaminated with so radioactive material that has a relatively long half-life and a high radioactivity level, it is a method of using gramineous plants, such as sweet sorghum, or other plants, such as sunflower, rape, pasture grass, or cabbage, to absorb the radioactive material. And then, as a subsequent process, a process of burying the plants in the earth or incinerating the plants is carried out. However, if the plants themselves are buried in the ground, a large area of land and enormous labors are required. In the case of the incineration process, the radioactive material adsorbed into the cells of the plants becomes condensed during the incineration process, and the high-concentration radioactive material might be released into the atmosphere as a gas even after passing through a filter.

Another known method is to carry out a fermentation process of plants and turn the resultant organic substances into biofuel (Non-Patent Document 4).

However, the disadvantages with this method are that, in the case of lignin or cellulose, the fermentation process takes a lot of time because the molecular weight thereof is high, and that the radioactive material still contained in the cell membrane cannot be removed. Moreover, the method is totally ineffective for the soil.

Still another known method is to use algae "binos": radioactive material is absorbed into cells of the algae from water contaminated with the radioactive material (Non-Patent Document 5). However, this method is only used for capturing the radioactive material dissolved in the water, and cannot be used for taking out the radioactive material in the body of an organism as in the case of the above-described method. Therefore the problem remains to how to deal with the radioactive material absorbed into the algae.

In the aftermath caused by an accident at a nuclear power plant or the like, large amounts of pollutants are generates. if the level of radioactive contamination thereof is not so high, a method of incinerating the pollutants is employed. After the 2011 Fukushima nuclear accident, large amounts of pollutants were incinerated, judging that the level of contamination thereof was not so high.

However, the radioactive material in incineration ash can be concentrated to, for example as much as 50,000 Bq/kq in terms of radioactivity level. Usually, in order to prevent the generation of dioxin, the incineration ash with porous media having such a fine structure that are high in water absorbability is exposed to about 900 degrees Celsius. The radioactive material is certain to be stored in pores of the porous media.

There is no specific report that the radioactive material has been taken out of incineration ash and reduced to a safe level in the living environment. Therefore there is a problem that large quantities of incineration ash are left unprocessed.

PRIOR ART DOCUMENTS

Non-Patent Documents

[Non-Patent Document 1] Mainichi Shimbun, "Purification of cesium contaminated water with pigment, developed by Tokyo Institute of Technology," Apr. 15, 2011, Mainichi Newspapers Co., Ltd

[Non-Patent Document 2] "This is the way to revive Fukushima soil; Food safety; JBpress," [online] [Searched on Sep. 20, 2011] Internet <URL:http://jbpress.ismedia.jp/articles/-/5920>

[Non-Patent Document 3] Masanori Arita, "Doc:Radiation/ Clay Minerals," [online], [Searched on Sep. 20, 2011], Internet <URL;http://metabolomics.jp/wiki/Doc:Radiation/ClayMinerals>

[Non-Patent Document 4] DECONTAMINATE RADIATED SOIL AND GENERATION, [online], [Searched on Jan. 30, 2012], Internet <URL;http://www.j-aid.jp/flowersforjapan>

[Non-Patent Document 5] Nihon Keizai Shimbun, "Utilization of algae for purification with algae "binos" for purifying radioactive-material contaminated water," Jul. 15, 2011, Morning edition from Nikkei Inc.

SUMMARY OF THE INVENTION

Problems to be Solved by the Invention

The present invention is intended to solve the above problems.

Means for Solving the Problems

The present invention includes: a heating/pressurizing/ pressure release step selected from the group consisting of a step of carrying out a heating process on the object in a state where temperature is less than or equal to the critical temperature of water, water-soluble liquid, or a mixture of water and water-soluble liquid (Hereinafter, "water, water-soluble liquid, or mixture of water and water-soluble liquid" is referred to as "aqueous liquid") and pressure is greater than or equal to the saturated vapor pressure of the aqueous liquid and then releasing the pressure, a step of placing the object under pressure and suddenly releasing the pressure, and a step of carrying out a heating process on the aqueous liquid and the object in a state where temperature is less than or equal to the critical temperature of the aqueous liquid and pressure is greater than or equal to the saturated vapor pressure of the aqueous liquid and then suddenly releasing the pressure; and a separation step of separating, after the heating/pressurizing/ pressure release step, a mixture of the object and the aqueous liquid into liquid and solid.

Advantages of the Invention

According to the present invention, from the object containing radioactive material, the radioactive material can be removed or reduced by the industrial process. After the object containing the radioactive material is processed by the present invention, the object can be safely returned to a living environment. In particular, when the heating process is carried out on the aqueous liquid and the object in a state where temperature is less than or equal to the critical temperature of the aqueous liquid and pressure is greater than or equal to the saturated vapor pressure, and then the pressure is suddenly released, the level of decontamination can further be improved.

Moreover, when aqueous liquid is added to the object before the heating/pressurizing/pressure release step, preferably the object is immersed in the aqueous liquid to such a degree that the object is covered or more, the level of decontamination can further be improved.

In the case of the present invention, "radioactive cesium" or "cesium" includes radioactive cesium compounds.

EMBODIMENTS FOR CARRYING OUT THE INVENTION

Figure 1:
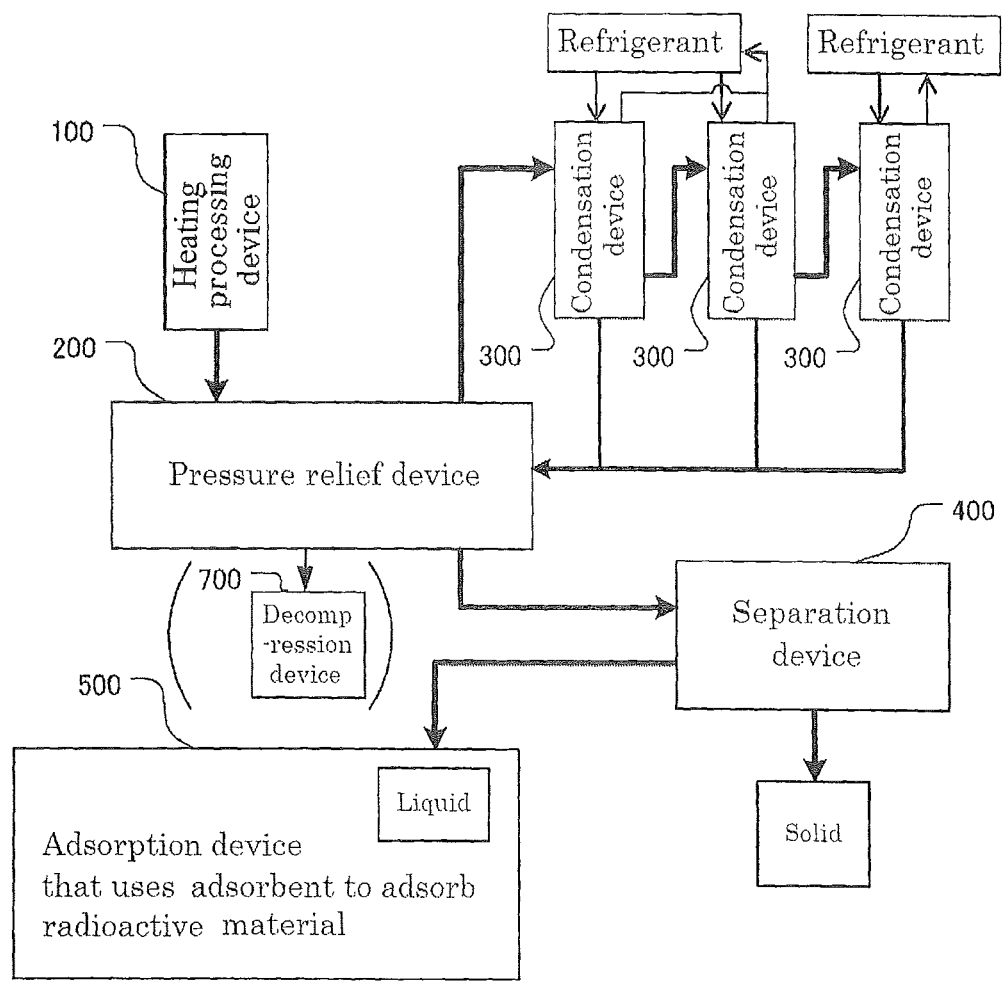
FIG. 1 is a block diagram showing one embodiment of a device of the present invention.

First, each of steps of a method of the invention will be described.

[An Object]

According to the present invention, an object containing radioactive material is referred to as an object. The object may be of any material; for example, organisms such as plants microorganisms in sewage sludge, soil, and incineration ash. The organisms include an organism that is intentionally placed with an aim to capture radioactive material in the soil, oceans, or rivers where the radioactive material is spread; and an organism that unintentionally captures the radioactive material.

[Step of Preferably Immersing the Object in Aqueous Liquid to Such a Degree that the Object is Covered or to a Greater Degree]

As a preliminary process prior to a heating process of the present invention, preferably, in a container where the heating process is carried out, the object is immersed in aqueous liquid to such a degree that the object is covered or to a greater degree. The "covering" means a situation where, at the next step, the object is covered with the aqueous liquid in a state where temperature is less than or equal to the critical temperature of the aqueous liquid and pressure is greater than or equal to the saturated vapor pressure. Accordingly, there is no need to immerse the object, in the aqueous liquid in advance to be covered; for example, even if there is not enough water in advance for the covering, the object may be covered during a heating process as steam used for heating at the next step is condensed and the resultant water is added. If heating is not carried out at the next step, it is preferred that the object is covered in advance. The "degree to which the object is covered" varies depending on the level of radioactivity of radioactive material of the object. However, if 70% or more, or preferably 80% or more, or more preferably 90% or more, of the object has been covered, a permeation effect of the aqueous liquid can be expected in many cases. However, in the above case, the container is fixed. If the container can rotate around a horizontal shaft, for example, the object has a good chance of being immersed even with a smaller amount of the aqueous liquid. Moreover, given the amount of the aqueous liquid that is condensed as the object is exposed to steam at normal temperature or below normal temperature, a large area of the object may be immersed. As the object is completely covered, and as the surface of the aqueous liquid becomes higher than the surface of the object, the amount of the aqueous liquid increases. As a result, the amount of radioactive material dissolving into the aqueous liquid rises, helping to improve decontamination effect. However, in order to raise the temperature, more energy is required. Optimal conditions for the "degree to which the object is covered" may be determined in such a way as to take a balance of the above factors. As a rough guide, if the container is fixed, the aqueous liquid is 1.5 to 5 times the volume of the object, or preferably 2 to 4 times. As the aqueous liquid, water, methanol, ethanol, acetone, or the like may be preferably used. Moreover, if the object has a fine porous structure, an aqueous liquid containing a surfactant is more preferably used because the aqueous liquid can easily infiltrate.

An operation of immersing the object to such a degree that the object is covered with the aqueous liquid or to a greater degree is a preferred method, but is not essential. The need for the covering varies depending on the state of the object. For example, if the object is an organism, there is no need to cover the object with the aqueous liquid because the object, or organism, itself contains water, which is the aqueous liquid, and there is no need to use the aqueous liquid; all that is required is just to pressurize the object at normal temperature. However, if the object is soil or incineration ash, the object is preferably immersed to such a degree that the object is covered with the aqueous liquid or to a greater degree.

[Heating/Pressurizing Step]

Then, the object and the aqueous liquid are subjected to a heating process (heating and pressurizing process) in a state where temperature is less than or equal to the critical temperature of the aqueous liquid and pressure is greater than or equal to the saturated vapor pressure; or the object is pressurized (pressurizing process). Each of the processes will be described.

[Heating and Pressurizing Process]

The container is hermetically sealed, and the aqueous liquid is heated. In this manner, a heating process is carried out in a state where temperature of the object is less than or equal to the critical temperature of the aqueous liquid and pressure is greater than or equal to the saturated vapor pressure. As the heating and pressurizing method, the following three types are available; in any case, the heating and pressurizing method is carried out by heating the aqueous liquid. One method is to put a mixture of the aqueous liquid and the radioactive material into a container and heating the aqueous liquid from the outside, thereby pressurizing by vapor pressure due to vaporization of the liquid. Another method is to put a mixture of the aqueous liquid and the radioactive material into a container in advance, introducing the saturated vapor of the same substance as the aqueous liquid into the container, and heating and pressurizing those in the container by using the heat and pressure thereof. Still another method is a combination of the above two methods. That is, this method uses both external heating and saturated vapor heat; as a pressure is added from the outside independently of pressure or heat generated by heating of the aqueous liquid, the entire object is immersed in the aqueous liquid and is pressurized. As a result, for example, if the object is one having porous pores such as soil or incineration ash, the aqueous liquid gets into the porous pores. Whereas if the heating process is carried out in a situation where there is no water in advance as in the case of steaming, the steam for the steaming may be partially condensed, but the amount thereof is very small, and the steam cannot get into pores of the incineration ash or the soil. The effects of the aqueous liquid getting into the pores will be described later.

The condition for carrying out the heating process is one type of subcritical state. If the aqueous liquid is water, the subcritical state generally means a state of high-temperature, medium-pressure water vapor that is greater than or equal to the critical temperature of water and is less than or equal to the critical pressure of water (the critical temperature of water is 374 degrees Celsius, and the critical pressure of water is 22.1 MPa), and a state of medium-temperature, medium-pressure liquid water that is less than or equal to the critical temperature of water and is greater than or equal to the saturated vapor pressure. According to the present invention, the process is carried out in the latter case, or in the subcritical state of medium-temperature, medium-pressure liquid that is less than or equal to the critical temperature of water and is greater than or equal to the saturated vapor pressure. Heating in the subcritical state of water is also referred to as hydrothermal. In this state, an ionic product of water is significantly larger than that at room temperature and under atmospheric pressure. The ionic product at room temperature and under atmospheric pressure is $10^{-14}$ moles$^2$/kg$^2$, whereas an ionic product in the subcritical state is $10^{-12}$ to $10^{-11}$ moles$^2$/kg$^2$, or is 100 to 1,000 times as large as the ionic product at room temperature and under atmospheric pressure; the concentration of H$^+$ and OH$^-$ is about 3 to 30 times as large as that at normal temperature. Therefore, hydrolysis power is very large, and a possible attack to a binding site where hydrolysis is very strong. The same is true for any water-soluble liquid other than water. In the case of a mixture of water and water-soluble liquid, based on the hydrolysis power that each component has and the ratio of components, the process is carried out in a state of medium-temperature, medium-pressure liquid that is less than or equal to the critical temperature of one of the components and is greater than or equal to the saturated vapor pressure of one of the components. Given such a strong hydrolysis power, radioactive materials, particularly cesium, are considered easier to dissolve in the aqueous liquid. If the temperature rises over 330 degrees Celsius, the ionic product of water rapidly falls as the temperature rises, leading to a rapid drop in hydrolysis power; because the hydrolysis power will disappear after exceeding the critical point, the process should be carried out at a temperature that is less than or equal to the critical point. Moreover, even when the temperature is less than 130 degrees Celsius, the hydrolysis power is gradually weakened. Therefore, the process is preferably carried out at 130 to 330 degrees Celsius, or more preferably 180 to 300 degrees Celsius, or even more preferably 230 to 280 degrees Celsius, or still more preferably 240 to 270 degrees Celsius. The reaction may take place with no catalyst; the use of catalyst is more effective. As the catalyst, iron material such as iron powder is preferably used. The object is preferably covered with the aqueous liquid and is processed under the above conditions; the object is therefore subjected to a strong hydrolysis power. If the object is soil or incineration ash, the radioactive cesium that is likely to exist in the porous media is subjected to a strong hydrolysis power. As a result, it is considered that radioactive cesium becomes easier to dissolve in the aqueous liquid. Even in the case of radioactive material absorbed into cell membranes, such as those of biological organisms contained in compost contained in clay or of organic microbes contained not in the compost but in the soil, after the pressure is suddenly released and the cell membranes are thereby destroyed, the radioactive material is released out of the cell membranes. Moreover, for example, if the object is a plant or microorganism, cell membranes are subjected to a strong hydrolysis power; the cell membranes are physically and chemically destroyed, and the cell fluid inside the cell membranes can flow out of the cell membranes. As a result, it is possible to decompose solid organic substances constituting the cell membranes into low-molecular-weight organic substances for a short period of time, as well as to decompose high-molecular-weight substances such as lignin and cellulose. As a result, it is considered that radioactive cesium becomes easier to dissolve in the aqueous liquid. Meanwhile, in the case of steaming, aqueous liquid is not enough to infiltrate into porous media or cell membranes, and porous media are just in contact with the steam. Therefore, radioactive cesium is unlikely to be dissolved in the aqueous liquid and subjected to hydrolysis power; or, even if the radioactive cesium might be dissolved in the aqueous liquid and subjected to hydrolysis power, the hydrolysis power is insufficient. Therefore, the steaming is less preferred.

In the container, the object occupies 60 to 90 percent by volume, or preferably 70 to 90 percent by volume, or more preferably 80 to 85 percent by volume, of the container, and then the pressure inside the container is intensified to a higher level. As the pressure is intensified, in the case where the object is incineration ash or soil, aqueous liquid is more likely to get into the pores thereof. In the case of organisms, the high pressure is desirable because the organisms are strongly affected physically and chemically. The pressure is greater than or equal to 3 standard atmosphere pressure (0.3 MPa), or preferably greater than or equal to 5 standard atmosphere pressure (0.5 MPa), or more preferably greater than or equal to 10 standard atmosphere pressure (1.0 MPa). As described above, as for the heating process, a method of heating a hermetically sealed space from the outside, or a method of adding a heating medium, for example, injecting steam, into the hermetically sealed space may be employed. However, in the latter case, only the steam is not enough to provide a sufficient amount of water; a certain amount of water therefore needs to exist in advance. To achieve this, the object may be immersed in the aqueous liquid. By the way, if the amount of the object occupying the container is less than the above preferred range, poor processing efficiency is the only problem. Therefore, it is not necessary to stick to the above range.

If the size of the container is large, the temperature inside the container likely would become uniform. Therefore, it is desirable that the container is small in size, or that stirring may be carried out. In the former case, a small container with a capacity of about 30 to 200 liters, or preferably with a capacity of about 30 to 100 liters, may be used. The processing time varies depending on the temperature. If a preferred temperature is set, several seconds are sufficient. If a preferred temperature cannot be achieved depending on the device, several seconds to 60 minutes, or 2 to 30 minutes in many cases, are sufficient. If large amounts need, a plurality of such small containers are prepared. As a plurality of the small containers works together or closely with each other, a predetermined temperature can be achieved for a shorter period of time than a heating time required for a large container to reach a predetermined temperature; the temperature distribution in the containers can be made uniform, and larger amounts can be processed than when a large container is used for the processing. For example, the object placed on a conveyor, the object is sent by a limit switch to a weighing instrument that is opened via a valve, and the valve is closed when an optical sensor detects the signal that a predetermined amount of the object has been measured. Then, the predetermined amount of the object is supplied into the containers. The inlets and outlets for the object and steam between the containers are closed by a limit switch when a predetermined condition is satisfied, and are sequentially subjected to the heating process.

In the state where temperature is less than or equal to the critical temperature of the aqueous liquid and pressure is greater than or equal to the saturated vapor pressure, unlike supercritical water, oxidation-reduction power is poor. Therefore, compared with a device for supercritical water, a container for subcritical reaction is not easily corroded. However, the existence of water and oxygen is a factor in accelerating corrosion. By expelling oxygen out of the heating process, it is possible to prevent the corrosion itself to a large extent. Moreover, when the pressure is rapidly released, the air (oxygen, nitrogen, or the like) in the containers does not turn into a liquid unlike water vapor. Therefore, in order to make the device smaller in size, it is desirable to keep the amount of the air is as small as possible. As a means of containing no oxygen, whether water is one used for steam or one that exists in advance, pure water is used. Moreover, it is preferred that, temperature of pure water is increased to about 80 degrees Celsius to expel oxygen dissolved in it. Another preferred means is that the air adsorbed into the object is expelled out of a blow tank or system with the use of water vapor with a pressure of 0.5 to 0.8 MPa, for example, so that the only gas within the system is water vapor. Still another preferred means is that inorganic phosphorus is not contained. After having taken the above care and attention, at a subsequent pressure release step, if the release of pressure after the heating process is carried out in such a way as to entail a sudden drop in pressure, everything inside the containers is blown away. Therefore, the inside of the containers is cleaned; it is therefore possible to use for a relatively long time. The above configuration is therefore preferred in terms of durability if the containers are used for a long time. The containers used in the present invention are preferably made of stainless steel such as austenite, martensite, or double-layer alloy, or high alloy steel; iron or the like, too, may be used. However, in the process of the reaction, cesium hydroxide is generated. Therefore, if the concentration of cesium is high, an attention needs to be paid to the strong alkaline thereof.

[Pressure Release Step]

The pressure of the object and the aqueous liquid is released into a hermetically sealed space. If the above heating and pressurizing process has been heated by the vaporization vapor pressure of the aqueous liquid, the pressure returns to normal pressure after the release process of the pressure. The release of the pressure may be carried out rapidly or gradually. However, the rapid release is preferred. If the pressure is not released rapidly, and instead the pressure is released gradually, ions of radioactive material, such as cesium, which has become activated under a heating condition, are slowly cooled under high pressure even as the ions become dissociated. Therefore, the ions become more likely to bind again to those to which the ions once bound before the dissociation. To prevent the rebinding as much as possible, a method of allowing an adsorbent for adsorbing radioactive material during the heating process to coexist is used preferably. Even when the pressure is released rapidly, an adsorbent for adsorbing radioactive material during the heating process may coexist. The adsorbing substances that can withstand a high temperature less than or equal to the critical temperature include inorganic adsorbents such as clay and zeolite. The adsorbents will be described later.

A step to place the object under pressure and releasing the pressure rapidly is an operation of breaking the object by means of a sudden change in pressure. The operation is also referred to as blasting. The "sudden release of pressure" means the ratio of the area of an opening ($cm^2$) for releasing the pressure at once to the volume of the hermetically sealed space ($cm^3$) that has been subjected to the heating process is greater than or equal to 0.0002/cm. The higher ratio is preferred. The ratio is preferably greater than or equal to 0.0005/cm, or more preferably greater than or equal to 0.001/cm, or even more preferably greater than or equal to 0.005/cm, or still more preferably greater than or equal to 0.01/cm. The above is defined for the case where the pressure is released under atmospheric pressure and the opening is opened at once. Under other conditions, the pressure difference thereof and the moving speed are appropriately converted. In that regard, it is preferred that the object is turned into fine powder prior to the heating process.

In the pressure release process, unlike the heating process, physical action is dominant. If the process in the heating/pressurizing process is a heating and pressurizing process, and the pressure is suddenly released after the heating process, in the case where the object is an organism, the pressure outside cell membranes returns to normal pressure because of the sudden release of the pressure whereas the pressure inside the cell membranes remains high. If the pressure difference thereof is large, the cell membranes are broken, and the radioactive materials absorbed into the cell membranes are exposed to the outside. In the case where the object is incineration ash or soil, a sudden volume expansion is caused not only by the thermal expansion of the aqueous liquid getting into the pores of the porous media of the soil or incineration ash, onto which radioactive material is considered to be adsorbed up to that point but also by the vaporization thereof. The pores are subjected to the sudden pressure and are further widened. As a result, the radioactive material can go out together with the aqueous liquid. Compared with a case where there is only a small amount of liquid caused by condensation as in the case of steaming, much more liquid has gotten into the pores of the porous media. Therefore, a sudden release of pressure can cause a sudden volume expansion in many of pores of the incineration ash or soil.

The sudden release of pressure comes with another advantageous effect. If instead pressure is not released rapidly, and instead the pressure is released gradually, ions of radioactive material, such as cesium, which has become activated under a heating condition, are slowly cooled under high pressure even as the ions have been dissociated. Therefore, the ions become more likely to bind again to those to which the ions once bound before the dissociation. However, if the pressure is suddenly released after the heating process, a transition occurs from a situation where hydrolysis can easily occur rapidly to a situation where hydrolysis is unlikely to occur, thereby lowering the possibility of rebinding. The probabilities are that the radioactive material would be discharged together with liquid or vaporization of the liquid. In that regard, a sudden release of pressure is preferred.

If the pressure is suddenly released, depending on the magnitude of the pressure previous to the release, a larger release space is required. If a sufficiently large space cannot be secured, an alternative method may be of depressurizing. In the specification and the appended claims, the phrase "release of pressure is performed in a hermetically sealed space capable of being released to normal pressure" is used in this meaning. If the pressure still cannot be released to normal pressure, the gaseous aqueous liquid, such as water vapor in gas, is condensed in the following manner.

When the temperature and pressure at the heating/pressurizing step and the pressure release step are appropriate, most of the radioactive materials are moved to the liquid side, and only a small amount of the radioactive materials remains in a solid state.

[Pressurizing/Pressure Release Step]

According to the present invention, instead of the above step, a pressurizing/pressure release step of placing the object under pressure and releasing the pressure suddenly may be employed. In this case, at the time of pressurization, the temperature may be normal temperature, or a high temperature less than or equal to the critical temperature. However, it is preferred that the temperature is a high temperature less than or equal to the critical temperature. During this process, physical action is dominant. The operation, effects, and conditions of the case where the pressure is suddenly released after the heating process are described above.

[Step to Remove Radioactive Material in Gas, Performed when Necessary]

If the object is subjected to the heating process, for example, the heating process in a hermetically sealed container, and then is naturally cooled, most of radioactive material is dissolved in the aqueous liquid, and only a small amount of the radioactive material remains in the gas. Therefore, in many cases, it is unnecessary to remove the radioactive material in the gas. However, in the case where the pressure is suddenly released, while a certain amount of the radioactive material turns into liquid, the temperature is high, and so the radioactive material is likely to accompany the gas. If the amount thereof exceeds a safe level, the radioactive material cannot be released into the atmosphere without any treatment. Therefore, in order to prevent the radioactive material that exists together with the vaporized water gas from releasing into the outside, the process of the present invention is carried out in a hermetically sealed system, and the radioactive material needs to be recovered. As the methods thereof may be used publicly-known methods, including a method of cooling the gas using a publicly-known heat exchange means such as flash condenser to condense the gas into aqueous liquid, a method of forcing the gas through an adsorption means such as adsorptive column to adsorb the radioactive material, and a method of forcing the gas through aqueous liquid to dissolve the radioactive material in the aqueous liquid. According to this method, the gas that has resulted from the heating process can be safely released into the atmosphere.

[Step to Separate into Liquid Phase and Solid Phase]

Then, the mixture of the object and the aqueous liquid is separated into liquid phase and solid phase. As the solid-liquid separation means for the solid phase and liquid phase, the publicly-known solid-liquid separation means may be used, including filter, squeezer, screw press, and centrifuge. The solid phase include not only the object from which the radioactive material is released to the outside world by the above process, but also an adsorbent for the case where the adsorbent is used during the heating process and the pressure release process. In the former case, even if the radioactive material released into the outside might attach to the surface, the amount of radioactive material adsorbed into the inner portion has been greatly reduced by the above process; a safe level may be achieved by washing. In this case, the object is returned to living space. If the adsorbent is mixed during the heating process and the pressure release process, the adsorbent onto which the radioactive material is adsorbed needs to be easily separated from the decontaminated solid. One method thereof is a method of using a difference in specific gravity. The specific gravity of some kinds of the object is greater than 1, while the specific gravity of the other kinds of the object is less than 1. If the specific gravity of the object is greater than 1, an adsorbent with a specific gravity of less than 1 is selected. If the specific gravity of the object is less than or equal to 1, an adsorbent with a specific gravity of more than 1 is selected. As a result, it is feasible to separate. However, the present invention is not limited to that. On the condition that the specific gravity of the object is less than 1, an adsorbent with a specific gravity of less than 1 may be selected; only the adsorbent that has adsorbed the radioactive material then may be precipitated by a flocculant, thereby separating the decontaminated object from the adsorbent that has adsorbed the radioactive material.

In the solid phase, in many cases, the fracture is fine when it is crushed by a sudden pressure release and the heating process. Therefore, in those cases, it is seemingly difficult to recognize the solid. The solid phase might be in a mushy liquid phase form rather than solid because of the existence of aqueous liquid. Depending on the solid-liquid separation means, substances that are solid but fine particles will be turned into liquid phase. However, many of those substances are at a safe level after the substances are washed when necessary. However, in some cases, some of those substances may be high in absorptivity to the radioactive material, and so have a high level of radioactivity. In this case, the substances are coagulated and precipitated by a flocculant.

If the solid itself exceeds the safe level because of the radioactive material still attaching to the surface of the object, the object is washed with water. As for the water washing, stirring washing is preferred. When the water washing is carried out, vibration of the solid is also effective. And yet when the solid still exceeds the safe level, water washing is repeated, and the safe level thereby is more likely to be achieved. And yet when the safe level still cannot be achieved, the above heating/pressurizing step and the pressure release step are repeated, and the safe level thereby can be achieved. In the washing water, the radioactive material is dissolved. Therefore, the washing water is put together with the liquid before undergoing the subsequent process.

As alternative, at the separation step, a filter press may be used.

In this case, a filter press step can be immediately performed to separate into solid and liquid. However, the process takes a lot of time. Therefore, it is preferred that, after the substances are separated into coarse-grained fractions and other substances, and then the coarse-grained fractions are washed with water to achieve a safe level, the substances other than the coarse-grained fractions, and the water used for the washing of the coarse-grained fractions are transferred to the filter press step. Since the coarse-grained fractions are at the safe level, the coarse-grained fractions can return to the living space. A preferable method of separating the coarse-grained fractions from the other substances is a method of pouring slurry which is the mixture of the liquid and the solid, onto a roll filter in such a way as to leave coarse-grained fractions on the roll filter and allow the other substances to pass through the roll filter and go into a filter press while centrifuging the coarse-grained fractions left on the roll filter and supplying the resultant liquid to the filter press. The water used for the water washing is preferably hot water, which can easily remove the radioactive material.

At the filter press step, the slurry transmitted from the previous step is subjected to the filter press, and then is washed with water. The filter press separates the slurry into liquid and solid, and the solid content becomes cake-like. According to the present invention, when the slurry cannot be transmitted because of choking, water may be injected to clear the choking. However, the water washing is carried out to wash away the radioactive material attaching to the surface of the solid. It was found that this kind of water washing is available for a pile of solid that underwent the filter press. The mesh size of the filter of the filter press is a mesh size that allows floating content known as "ss" to remain on the solid side. If the object is an organism and the hydrothermal time is long, hydrolysis proceeds and the object becomes solubilized to such a degree that choking can occur, the washing takes a lot of time. Therefore, an appropriate hydrothermal time is set in such a way as to prevent the choking and to generate a solid material that can be easily washed with water. When the water washing is carried out, hot water is preferred because the solubility of radioactive material is high. Through the above process, the solid in the slurry becomes cake-like, and the radioactive material contained therein can be lowered to a safe level.

[Step to Adsorbing Radioactive Material in the Liquid Phase or Vaporizing Aqueous Liquid]

Phase, the radioactive material is dissolved, and so the liquid phase cannot be returned to living space without any treatment. Therefore, the liquid phase is processed through one of the following two steps: a step to absorb the radioactive material in the liquid phase, and a step of vaporizing the aqueous liquid.

[Step to Adsorbing Radioactive Material in the Liquid Phase]

First, the step to adsorbing the radioactive material in the liquid phase will be described. In the liquid phase, water-soluble radioactive material, such as cesium, is dissolved. To remove the radioactive material from the liquid phase, an adsorbent is put into the liquid phase. In the case, some kind of adsorbent may be in a suspended form while the radioactive material is being adsorbed. In such a case, a coagulating agent for coagulating the suspending adsorbents, a flocculant for coagulating these substances, and the like are put into the liquid phase to precipitate the adsorbent. As a result, the liquid mainly made of aqueous liquid containing almost no radioactive material is separated from the precipitate containing radioactive material. An operation of adsorbing the radioactive material may be chemical adsorption or physical adsorption. The adsorbent is exemplified by ferrocyanide, zeolite, activated carbon, silica gel, activated alumina, and ss made of clay mineral. Some of the adsorbents float in the liquid phase due to the apparent specific gravity thereof, while the others precipitate; those adsorbents are appropriately used as described later. The adsorbents may be filled the column so that the liquid pass through the adsorbents in the column; or required amounts of the adsorbents may be poured into the liquid phase and stirred. In the case of the stirring, the stirring may be performed as part of the above washing step. In the former case, namely, the case where the column is filled with the adsorbents and the liquid pass through the adsorbents, the particle size of the adsorbents needs to be such that the adsorbents can fill the column and do not flow away. In the latter case where the adsorbents are poured into the liquid phase, the adsorbents floating in the liquid phase may lead to trouble. Therefore, there is a need to use a flocculation-sedimentation agent being able to flocculate and precipitate only the adsorbents. For example, ferrocyanide is fine powder unless the ferrocyanide is particularly granulated. Therefore, granulation of the ferrocyanide is performed. When the fine powder of ferrocyanide is used, a flocculant is used. In the case of magnetic material such as ferrocyanide, agglomeration means such as those using a magnet to attract, may be used. The radiation intensity of the liquid having been affected by the influence of the adsorption of the adsorbent, if the appropriate adsorbent and an appropriate amount thereof are selected, can be get a safe level for the living environment without any further treatment. The adsorbent and the flocculant, which is used when necessary, are separated from the liquid phase.

The mixture of the liquid and the adsorbent that have adsorbed the radioactive material may be transported, without any treatment, to a disposal site where water may be naturally evaporated. However, since the amount of radioactive material of the liquid phase is negligible, the adsorbent may be separated from the liquid phase, and only the adsorbent may be transported to a final disposal site; there is no harm to the environment even if the liquid is discharged or reused without any treatment.

The adsorbent that has adsorbed the radioactive material is stored and preserved in a container capable of keeping the radiation intensity of radioactivity under control. The container is made of concrete, lead, or any other material that can significantly reduce the degree of radiation released into the outside. Concrete is preferably used. In this case, the container becomes a storage container at a final disposal site when the dose of radiation of the adsorbent that has adsorbed the radiation is high. When the dose of radiation of the adsorbent is low, the adsorbent that has adsorbed the radioactive material may be mixed with cement; for example, when used as concrete, the adsorbent may be used for civil-engineering and construction materials for which concrete is originally used, for example.

[Fermentation Process, Performed when Necessary]

If the object is a plant, sugar is dissolved in the liquid that has been separated from the adsorbent. Therefore, a fermentation process can be performed by using an enzyme. The enzymes used for the fermentation are exemplified by yeast and methanogen. The fermentation turns the object into a mixture of fermentation products, such as alcohol, aldehyde, and methane, sugars, water, and the like. After the fermentation proceeds to a certain degree, the fermentation may not proceed further even if there still are enough sugars. In this case, the fermentation products are removed and so the fermentation process is further carried out. After the fermentation process, water is separated from the fermentation products. The separation method may vary according to the nature of the fermentation products; for example, in the case of alcohol, distillation is carried out to obtain alcohol and water. The above process can reduce the molecular weights of cellulose and lignin in a short period of time, and turn the substances into single cells and so monosaccharides. Therefore, the fermentation time can be reduced. In particular, in the case where the heating process is carried out in a subcritical state of water and then a process of rapidly releasing the pressure is performed, the effects thereof are significant. The resultant fermentation products are at a safe level, and therefore can be safely used. Examples of the application thereof include biofuel, which is used for power generation and the like.

[Step of Vaporizing the Liquid in which Radioactive Material is Dissolved]

The following describes a step of vaporizing the aqueous liquid, instead of adsorbing the radioactive material in the liquid. In the liquid that has undergone the step of separating into the liquid and the solid, the radioactive material is dissolved. The radioactive material can be concentrated by vaporizing the liquid. As the vaporization means, a publicly-known means, such as heating, evaporation at normal temperature, or drying under reduced pressure, is employed. In the case, waste heat from a thermal power plant, a nuclear power plant, an incinerator, or the like may be available. As for the drying under reduced pressure, freeze-drying under reduced pressure is preferably employed. The vapor pressure of cesium is lower than the vapor pressure of water. Therefore, the liquid is frozen, and is dried under reduced pressure. If the radiation intensity of the vapor is at a safe level, the vapor can be released into the atmosphere without any treatment. If the radiation intensity of the vapor is not at a safe level, the vapor is collected and frozen, and a step of vaporizing again under reduced pressure is repeated. As a result, the radiation intensity of the vapor can be lowered to a safe level. After the vaporization of the liquid, the remaining radioactive material is hardened with resin or concrete, for example, and is aggregated. At this concentration step, no adsorbent is used; the radioactive material therefore can be aggregated into a small quantity, leading to an improvement in aggregation performance.

The following describes a processing device of another invention of the present invention on the basis of the accompanying drawings.

FIG. 1 is one embodiment showing a processing device of the present invention. The present embodiment includes: a chemical processing device 100, that processes an aqueous liquid and an object into which radioactive material is absorbed in a state where temperature is less than or equal to the critical temperature of the aqueous liquid and pressure which is greater than or equal to the saturated vapor pressure of the aqueous liquid;

a pressure relief device 200 that communicates with the heating processing device 100 and has a space that enables the pressure to be released to normal pressure, or the pressure relief device 200 and a condensation devices 300 that condense add of the gaseous aqueous liquid, if the pressure cannot be released to normal pressure;

a separation device 400 that separates the mixture of the object and the aqueous liquid into liquid and solid; and an adsorption device 500 that adds an adsorbent which adsorbs radioactive material to the separated liquid so that the radioactive material is adsorbed onto the adsorbent, to separate the radioactive material from the liquid.

[Heating Processing Device 100]

Figure 3:
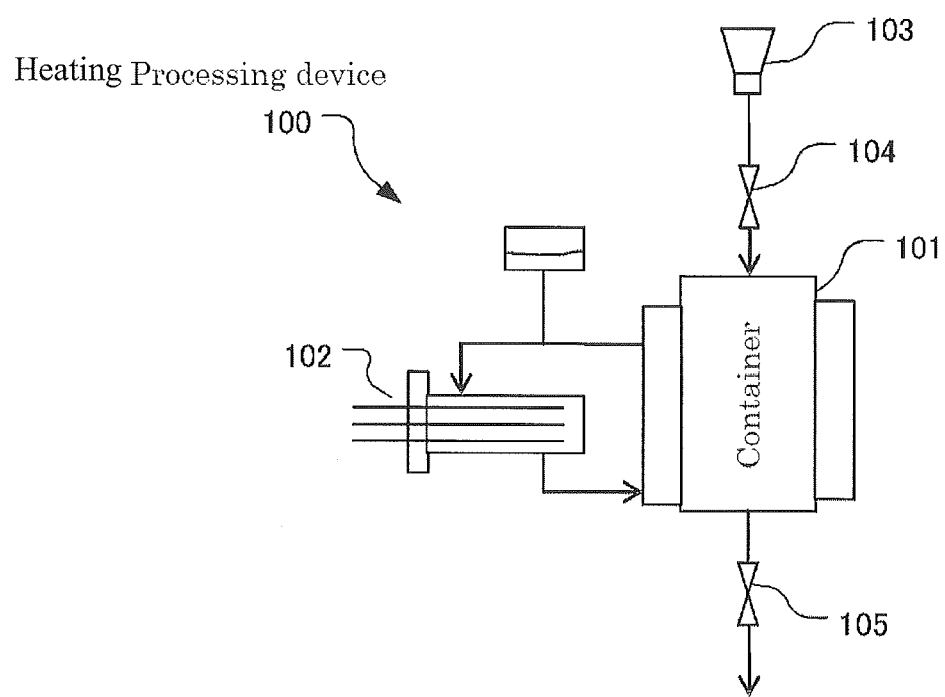
FIG. 3 is a schematic diagram of a heating processing device 100 shown in FIGS. 1 and 2.

As shown in FIG. 3, the chemical processing device 100 includes a hermetically sealed container 101 in which a process is carried out; a heater 102 which heats the container 101; an inlet hopper 103 through which the object and the aqueous liquid are put into the container 101; a valve 104 which is located between the inlet hopper 103 and the container 101; and a ball valve 105, which is opened and closed between the container 101 and the pressure relief device 200. The heater 102 heats a heat medium, and heats the container via a jacket attached to the outside of the container. As a heating method different from the method illustrated in the diagram, there is a method of mounting a heater inside the container so that the substances inside the container are directly heated. Another method is one of directly heating the outside of the container using a heater attached to the outside of the container 101. Still another method is one of heating a heat medium by using a heater, and directly heating the substances inside the container via a heating tube or heating panel mounted inside the container. As another heating method, there is a method of providing a nozzle to inject the saturated vapor of the aqueous liquid into the container 101, and injecting the saturated vapor of the aqueous liquid through the nozzle, and heating and pressurizing until a predetermined temperature/pressure state is achieved. Furthermore, the combination of a heater, a heat medium or the like from outside and the heating by injecting the saturated vapor of the aqueous liquid may be used. A rapid release of pressure causes an inertial force due to a discharge of the substances inside the container when the substances are rapidly discharged, and the internal pressure may temporarily become a near vacuum. In this case, particularly in the case of the method of directly heating the substances in the container, sudden, strong force might be applied to the internal heater, the internal tubular heater, or the heating panel. Accordingly, there is a need to take sufficient means for holding the internal components against the vacuum and the flow. As the method thereof, for example, in order to strengthen mounting of components, the components may be directly welded to an internal surface of the container; or mounting brackets may be welded inside the container, and the components may be fixed with strong bolts and nuts; or a shape that does not resist the flow of the substances in the container that are discharged, such as a streamline shape, may be made; or a discharge flow path for the substances in the container is so secured as not to generate a reserver of pressure. In this manner, it is necessary to take such means.

[Pressure Relief Device 200]

Figure 4:
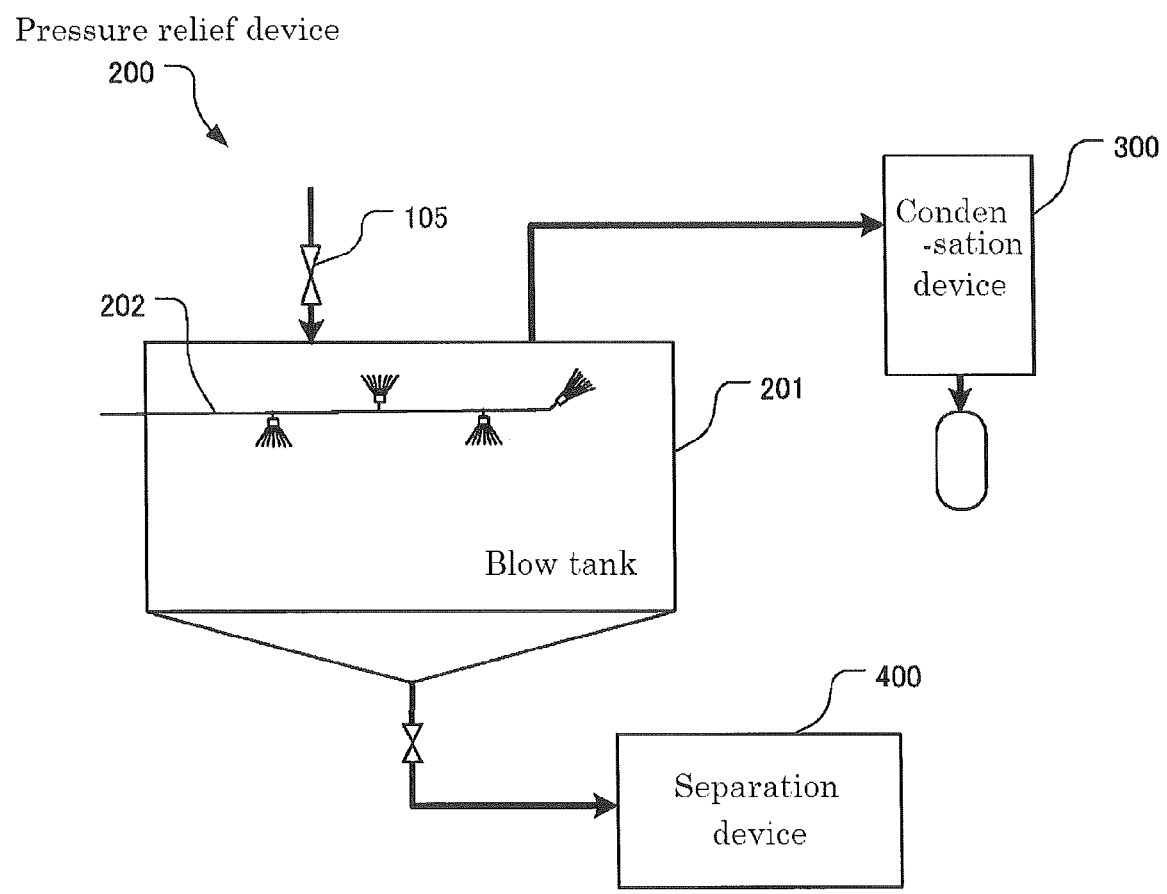
FIG. 4 is a schematic diagram of a pressure relief device 200, a condensation device 300, and a separation device 400 for separating liquid and solid, which are shown in FIGS. 1 and 2.

As shown in FIG. 4, the pressure relief device 200 includes a valve, preferably a ball valve 105, which is opened and closed between the pressure relief device 200 and the container 101; a blow tank 201 which is a hermetically sealed space; and a washing means for washing away those attaching to an inner wall of the blow tank 201, which is, for example, a spray shower 202. Among the above components, the blow tank 201 is a space into which the pressure is released. If large amounts are processed, and if containers 101 are plurally prepared, a common blow tank 201 may be used; in this case, the object in each container is sent to the common blow tank 201. During this process, some of the radioactive material is dissolved into the aqueous liquid, while the others may be attached to the object which crushed by a sudden release of pressure and attached to the wall of the blow tank 201. In the latter case, the radioactive material can be dissolved to the water as the inside of the blow tank 201 is sometimes washed with water, and be sent to the next processing step. As the blow tank 201 becomes larger in size, a sudden volume expansion occurs; since the volume expansion occurs in an adiabatic manner, the temperature of the object in the blow tank decreases sufficiently, and the pressure may become normal pressure. The decrease in temperature becomes larger as the inside of the blow tank is larger in size. Moreover, if the inside of the blow tank is connected to a decompression device 700 (FIG. 1) and the pressure is reduced, the decrease in temperature becomes larger as the degree thereof is increased. The decompression device 700 can reduce the pressure of the blow tank 201 in advance. In the case, inside the blow tank 201 normally, no radioactive material is contained. Therefore, the air can be discharged to the outside. If the radioactive material might be attaching to the inner wall of the blow tank 201 or the like after repeated use of the blow tank 201, a moisture separation device, such as a demister or filter, may be provided in an exhaust path of the decompression device 700; only clean gas that has passed through the separation device is released to the outside.

[Condensation Devices 300]

As condensation devices 300, publicly-know condensation devices are used, such as a water-cooled type, an evaporation type, and an air-cooled, and such as a shell-and-tube condenser, a double pipe condenser, and a plate fin condenser. The condensers are so provided as to achieve a necessary number of stages. FIG. 1 shows an example of three-stage shell-and-tube condensers. For the first and second stages, a refrigerant of the same temperature is used. For the last, third stage, a lower-temperature refrigerant is used. The main condenser works in the first stage and a small amount of those not yet condensed are condensed in the second stage. The third stage uses a lower-temperature refrigerant for confirmation. Moreover, a silencer is usually required to cancel the sound generated by shocks at a time when the pressure is suddenly released. However, according to the present invention, as a condensation device is required, the condensation device serves as a silencer. Therefore, the silencer is not necessary. If there is a need to release the pressure to the outside, a pressure release valve with a demister or a filter that removes the aqueous liquid containing radioactive material may be provided, after the condenser.

[Separation Device 400 that Separates the Mixture of the Object and the Aqueous Liquid into Liquid and Solid]

As the solid-liquid separation device for the solid and liquid, publicly-known solid-liquid separation device may be used, including filter, squeezer, screw pressing, centrifuge, and filter press.

[Adsorption Device 500 that Adds Adsorbent which Adsorbs Radioactive Material, to the Liquid so that Radioactive Material is Adsorbed onto Adsorbent]

Figure 5:
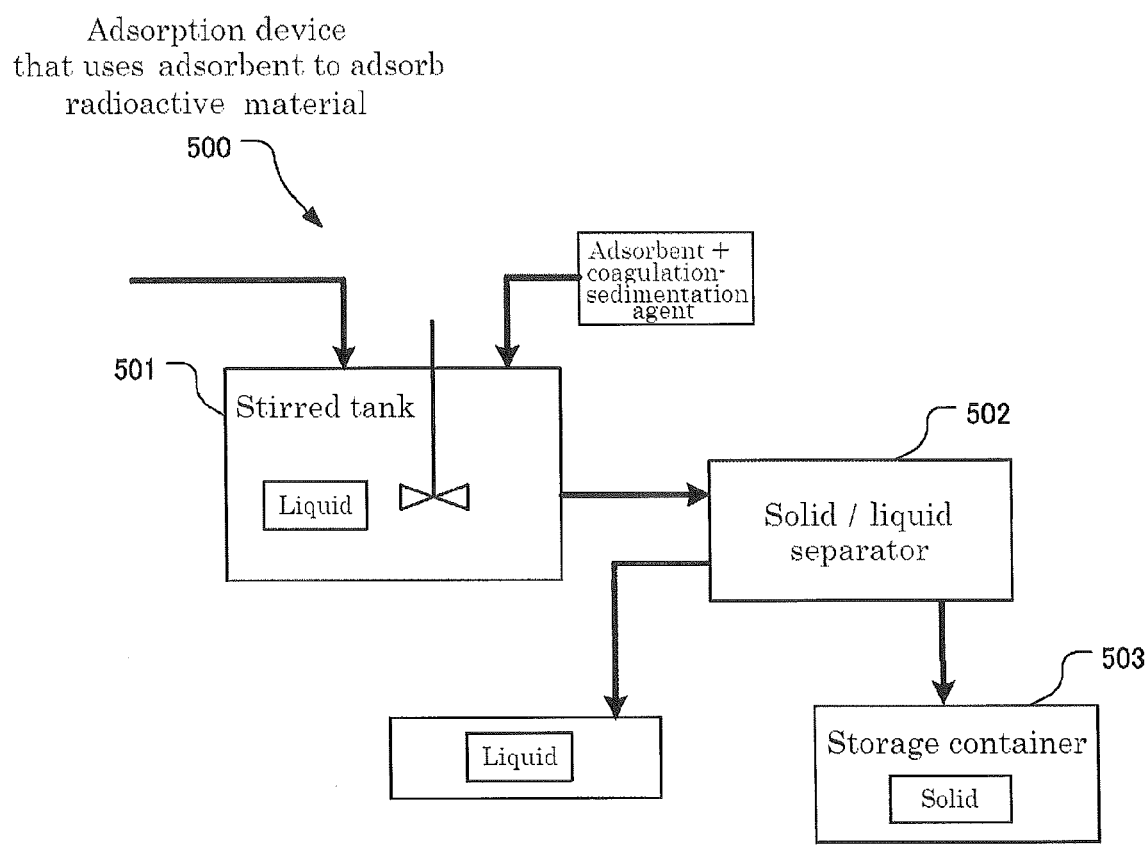
FIG. 5 is a block diagram of an adsorption device 500.

As the adsorption device 500 that uses an adsorbent to adsorb the radioactive material, publicly-known means are employed, including: a device in which the liquid passes through a column filled with the adsorbent; and a device that puts the adsorbent into a stirring device for stirring. After the adsorption process, the separation process of the liquid and the adsorbent is carried out by centrifugation, filtration, or any other method, depending on physical properties of the adsorbent. FIG. 5 shows one example thereof. The adsorption device 500 includes a stirred tank 501, into which the adsorbent that adsorbs the radioactive material dissolved in the liquid, the coagulation-sedimentation agent that is used when necessary, and the liquid are put and which includes a stirring device for stirring and mixing those substances; a solid/liquid separator 502, which separates the liquid from the solid such as the adsorbent and the flocculant that is put therein when necessary; and storage containers 503 in which the liquid and the solid each are stored.

Figure 2:
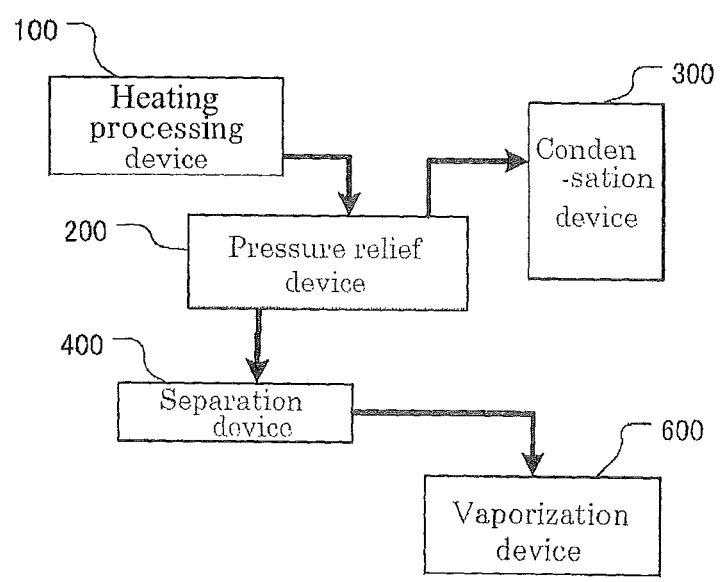
FIG. 2 is a flow sheet of another embodiment of a device of the present invention.

FIG. 2 shows another embodiment of the present invention. Some components are the same as those in the embodiment of FIG. 1. This embodiment is different from the embodiment of FIG. 1 in that, instead of using the adsorption device 500 at the end, a vaporization device 600 (concentration device) is used. As for the vaporization device, a publicly-known device is used.

Example 1

The stems of sunflower (Vincent Tangerine) were cut at the base thereof. The tips of the stem were immersed in 80 g of water in which 3.923 mg of cesium 133 was dissolved for four days at normal temperature. Then, a hydrothermal process (heating process) was carried out. The hydrothermal process was performed at 120 degrees Celsius and 0.2 MPa for 30 minutes. In the run-up to that point, the temperature and the pressure were linearly raised from normal temperature and normal pressure to 120 degrees Celsius and 0.2 MPa. After the hydrothermal process, the pressure and the temperature were brought back to normal pressure and normal temperature. After that, to 10 mL of hydrothermally-processed liquid, 0.1 g of ferric ferrocyanide (commercially-available pigment "prussian blue") was added and stirred. After the stirring precess, flocculat "Ion Reaction N" (commercially available product manufactured by Saiseisha) was used, and the ferric ferrocyanide was coagulated and precipitated. After that, a 0.20 μm membrane filter (RC15) was used for filtration, and then the filtrate was centrifuged at 10,000 rpm for 10 minutes, and was diluted with water the amount of which was 1,000 times that of the filtrate. After that, ICP-MS was used to measure the cesium content in the filtrate. The results are shown in Table 1 (See "Liquid" of Post-hydrothermal Process in the table).

After the above hydrothermal process, residues were dried at 110 degrees Celsius for 16 hours. Then, 0.1 g of the dried substances was dissolved in 5 ml of concentrated nitric acid, and ultrasonic waves were used to accelerate the dissolution rate. The substances were then diluted to 1,000 ml, and ICP-MS was used to measure the cesium content in the residues. The results are shown in Table 1 (See "Solid" of Post-hydrothermal Process in the table). In Table 1, the solid means sunflower, or solid after the hydrothermal process; the liquid means the water used for the immersion, or liquid after the hydrothermal process.

Examples 2 to 6

Except that the temperature and the pressure of the hydrothermal process were changed as shown in Table 1, Examples 2 to 6 were carried out in a similar way to Example 1. The results are shown in Table 1. In the table, the hydrothermal process was performed on the solids (stems of sunflower) after the solid were immersed for four days. Therefore, the cesium content in the hydrothermally processed solids plus the cesium content in the hydrothermally processed liquid should substantially equal the quantity of the cesium content after the solid was immersed for four days. However, because of microanalysis and recovery loss, the results had error (about several tens of percent). However, it is clear that, as the temperature of the hydrothermal process approaches 250 degrees Celsius at which the ionic product is maximized, the cesium content in the solid decreases, and shifts into a liquid section.

TABLE 1

| | Hydrothermal Conditions | | Cesium Content (mg) | | | | | | Cesium Removal Rate of Liquid |
| --- | --- | --- | --- | --- | --- | --- | --- | --- | --- |
| | | | Pre-Immersion | | 4 days after immersion | | Post-hydrothermal process | | |
| | Temperature (° C.) | Pressure (MPa) | Solid | Liquid | Solid | Liquid | Solid | Liquid | Section (%) |
| Example 1 | 120 | 0.2 | 0 | 3.92 | 2.87 | 1.05 | 1.77 | 1.23 | 99.6 |
| 2 | 140 | 0.4 | 0 | 3.92 | 3.70 | 0.22 | 1.19 | 2.47 | 99.9 |
| 3 | 180 | 1.0 | 0 | 3.92 | 3.01 | 0.91 | 0.60 | 1.91 | 99.7 |
| 4 | 200 | 1.4 | 0 | 3.92 | 3.07 | 0.86 | 0.42 | 1.62 | 99.6 |
| 5 | 220 | 2.3 | 0 | 3.92 | 3.06 | 0.86 | 0.36 | 2.01 | 99.5 |
| 6 | 240 | 3.3 | 0 | 3.92 | 2.76 | 1.17 | 0.22 | 2.68 | 99.8 |

Example 7

An object was sewage sludge taken from a terminal disposal site in Horikawa-cho, Fukushima City. 31.1 g of sewage sludge containing radioactive cesium with a radioactivity of 3,110 Bq (about 100,000 Bq per kg; 75% was water, with 6 g of solid). The sewage sludge was mixed with 93.1 g of water, and was put into an autoclave for a hydrothermal process. As for the autoclave, a 500 cc high pressure micro-reactor (manufactured by Omlabotech Co., Ltd.) was used. As for the hydrothermal process, the time during which the temperature was raised from normal temperature to 260 degrees Celsius was 60 minutes, with 4 MPa at 260 degrees Celsius; the retention time thereof was 30 minutes; the cooling time needed to bring the temperature from 260 degrees Celsius to normal temperature was 90 minutes. After the hydrothermal process, a nylon mesh (150 mesh) was used for filtration. The filtrate was 94.2 g and 1,680 Bq (about 1,800 Bq per kg); the residue was 16.3 g and 1,077 Bq (about 66,000 Bq per kg).

As described later, the filtrate was almost 100% decontaminated. Therefore, if the decontamination rate was defined as (Becquerels before the said decontamination process−Becquerels in residue after the said decontamination process)/Becquerels before the said decontamination process, the decontamination rate was 66% at this stage.

Then, the residue was washed with water. The water washing was carried out as stirring washing: to 16.3 g of the residue, 438 g of water that was 30 times was added. Then, as in the above-described case, a nylon mesh was used for filtration. The filtrate was 443 g and 600 Bq (about 1,350 Bq per kg); the residue was 7.5 g and 357 Bq (about 47,600 Bq per kg). At this state, the decontamination rate was 89%.

Then, the above two filtrates were mixed and then, 1% of ferric ferrocyanide and 0.8% of floccgulant "Ion Reaction P" (commercially available product manufactured by Saiseisha) were added to the filtrates and stirred. Then, as in the above-described case, a nylon mesh was used for filtration. The filtrate was 490 g and 50 Bq (about 102 Bq per kg); the residue was 45 g and 1,953 Bq (about 43,400 Bq per kg). In the filtrate, the decontamination rate was 98%. The radioactivity in the filtrate finally was lowered to about 100 Bq/kg.

Of 31.1 g of sewage sludge at the initial stage, 75% was water, with about 6 g of solid. However, most of the solid were microorganisms. On the other hand, of 45 g of the final residue, 95% or more was water, with 2 g of solid. Since cell membranes were destroyed during the hydrothermal process, most of the solid were presumed to be clay.

It was found that the process of the present invention turns 31.1 g of sewage sludge into 2 g of solid by removing the water, and that the radioactive material, too, is aggregated.

Example 8

An object was 30.0 g of soil with radiation intensity of radioactive cesium being 1,650 Bq (about 55,000 Bq per kg), which was taken from Iidate Village in Fukushima Prefecture. The radiation intensity was measured by a germanium dosimeter. The soil was mixed with 90.1 g of water, and was put into an autoclave for a heating (hydrothermal) process. The autoclave was a 500 cc high-pressure micro-reactor (manufactured by Omlabotech Co., Ltd.). The details of the hydrothermal process were given below; the time during which the temperature was raised from normal temperature to 260 degrees Celsius was 60 minutes, with 4 MPa at 260 degrees Celsius; the retention time thereof was 30 minutes; the cooling time needed to bring the temperature from 260 degrees Celsius to normal temperature was 90 minutes. After the hydrothermal process, a nylon mesh (150 mesh) was used for filtration. The filtrate was 68.6 g and 960 Bq (about 13,990 Bq per kg); the residue (containing water) was 18.5 g and 690 Bq (about 37,300 Bq per kg). The filtrate was almost 100% processed. Therefore, if the decontamination rate was defined as (Becquerels before the said decontamination process –Becquerels in residue after the said decontamination process)/Becquerels before the said decontamination process, the decontamination rate was 58.2% at this stage.

Then, the residue was washed with water. The water washing was carried out at stirring washing: to 18.5 g of the residue, 400 g of water that was about 20 times or more was added. Then, as in the above-described case, a nylon mesh was used for filtration. The filtrate was 385.3 g and 380 Bq (about 986 Bq per kg); the residue (containing water) was 14.2 g and 340 Bq (about 23,940 Bq per kg). At this stage, the decontamination rate was 79.4%. In this manner, the radioactive material in the residue was reduced. Therefore, the residue can be brought back to the living environment without any further treatment, or after being mixed with a small amount of uncontaminated soil.

Then, the above two filtrates were mixed. And then, 0.2% of ferric ferrocyanide and 0.2% of flocculant "Ion Reaction P" (commercially available product manufactured by Saiseisha) were added to the filtrates and stirred. During this process, radioactive cesium dissolved in the filtrates was adsorbed onto the ferric ferrocyanide, and was precipitated by the flocculant. Then, as in the above-described case, a nylon mesh was used for filtration. The filtrate was 417 g and 40 Bq (about 96 Bq per kg); the residue of the filtrate coagulated and precipitated (containing water) was 32 g and 1,210 Bq (about 37,813 Bq per kg). The decontamination rate of the filtrate was 98%. The radioactive intensity in the filtrate finally was lowered to about 100 Bq/kg.

Example 9

Example 9 was different from Example 8 in that, instead of 50.1 g of water, 150 g of water was used; and, instead of the autoclave, a Yoshimura-type grain expansion machine (manufactured by puffed-cereal machine sales Co., Ltd.) was used. Soil and water were put into the pot thereof (the shape of an opening covered with the lid of the pot was circular with a diameter of about 7 cm; the capacity of the pot was 600 cm$^3$). From the outside, the pot was quickly heated by propane gas, so that the surface temperature of the pot became 200 to 210 degrees Celsius with a pressure of 2.0 to 2.4 MPa; The temperature was kept for ten and several minutes. The surface temperature of the pot was that of outside of the pot measured by a noncontact thermometer. And then, a wooden hammer was used to hammer a claw of a stopper, which was designed to fix the body of the pot firmly to the lid of the pot. As a result, the pressure was released at once into a box extending from the opening of the expansion machine. The ratio of the area of the opening, about 50 cm$^2$, to a heating-process space volume of the pot of the expansion machine, 600 cm$^3$, was about 0.08/cm. The box made of steel (with a thickness of 1.2 mm; which was a rectangular parallelepiped that was 60 cm×60 cm×120 cm in size) containing a plastic container (which was made of polystyrol with a thickness of 5 mm; which was a rectangular parallelepiped that was 35 cm×35 cm×120 cm in depth, in size). The plastic was damaged by the release of pressure; the reactant attaching to a wall surface of the box was wiped with Kimwipes (Registered Trademark) and recovered. The radiation intensity of the processed soil was 8,700 Bq/kg. The filtrate corresponding that of Example 8 was dispersed as water gas in this example. If the water gas had been cooled and liquefied, and the adsorbent had been used as in the case of Example 8, the results similar to those of Example 8 would have been expected to be obtained. In this example, the soil with a radiation intensity of 55,000 Bq/kg was lowered to 9,000 Bq/kg or less, or one-sixth or less of the radiation intensity before the process.

Example 10

The amount of soil was 150 g, and the amount of water was 150 g as in the case of Example 9. It could be inferred that, in the pot, the water surface was about 20% higher than the surface of the soil. The rest of the process was carried out as in Example 9. The radiation intensity after the process was 20,000 Bq/kg, or about half or more of that of the unprocessed soil.

Example 11

The amount of soil was 200 g, and the amount of water was 150 g as in the case of Example 9. It could be inferred that, in the pot, the water surface was slightly higher than the surface of the soil. The rest of the process was carried out as in Example 9. The radiation intensity after the process was 22,500 Bq/kg, or about half of that of the unprocessed soil.

Comparative Example 1

Comparative Example 1 was carried out in the same way as Example 8 except that the heating process was not performed. The radiation intensity in the residue (containing water) after the water washing was 720 Bq in 27.4 g (about 26280 Bq per kg). The decontamination rate was 56.4%. Compared with the case where 79.4% was achieved as the heating process was performed, the decontamination rate was lower.

Comparative Example 2

Comparative Example 2 was different from Example 9 in that, instead of 150 g of water, 7 g of water was used; 7 g of water was an amount equivalent to an amount of the saturated water vapor in the pot with a capacity of 600 cm$^3$ at 200 to 210 degrees Celsius. The water contained in the system was only the water and water vapor contained in the soil. There was not enough water for the soil to be immersed. This example was a quasi-experiment that was conducted under the same condition for the steaming. The rest of the process would have been carried out as in Example 9. However, because the heating was actually carried out by using a propane gas burner, the temperature was not managed to be controlled; the temperature rose to 297 degrees Celsius as a result. The radiation intensity of the processed soil was 115,000 Bq/kg. The reason why the radiation intensity was higher than that of the unprocessed was supposed that evaporation might have occurred because the water was contained in the unprocessed soil. In comparison with the examples, it is clear that the steaming cannot decontaminate, and most of the soil would have to be covered with aqueous liquid.

Example 12

30.6 g of incineration ash with a radioactivity of 1,385 Bq (Radiation intensity 45,300 Bq/kg), which was an object, and 160.4 g of hot water were put into a pot of a Yoshimura-type grain expansion machine (manufactured by puffed-cereal machine sales Co., Ltd.). The shape of an opening of the pot was circular with a diameter of about 5 cm; the capacity of the pot was 600 cm$^3$. The opening was closed with the lid. From the outside, the pot was heated by propane gas, and was quickly heated, so that the surface temperature of the pot became about 240 degrees Celsius with a pressure of 2 MPa; this state was kept for five minutes. The surface temperature of the pot was that of outside of the pot measured by a noncontact thermometer. And then, a wooden hammer was used to hammer a claw of a stopper, which was designed to fix the body of the pot firmly to the lid of the pot. As a result, the pressure was released at once into a steel box whose interior was a recovery polystyrol container with an opening facing the expansion machine. The ratio of the area of the opening, about 50 cm$^2$, to a heating-process space volume of the pot of the expansion machine, 600 cm$^3$, was about 0.08/cm. The polystyrol container was a rectangular parallelepiped with a thickness of 5 mm that was 55 cm×55 cm×120 cm in depth, in size. The steel box was a rectangular parallelepiped with a thickness of 1.2 mm that was 60 cm×60 cm×120 cm in size. The processed incineration ash that was attaching to a wall surface of the box and containing water was wiped with Kimwipes (Registered Trademark) and recovered; 31.9 g of the incineration ash was obtained, and the radiation intensity thereof was 8,390 Bq/kg. There was no residue in the pot. Most of the hot water poured therein was dispersed as vapor. In this example, the dispersed vapor was not cooled and liquefied for recovery. Needless to say, if such an operation had been carried out, radioactive cesium dissolved in the water would have been adsorbed onto an adsorbent. 31.9 g of the recovered substance was dispersed in 301.2 g of hot water and stirred; solid-liquid separation was carried out by using filter paper (No. 1). The filtrate was 251.2 g, the radioactivity thereof was 181 Bq, and the radiation intensity thereof was 720 Bq/kg. Radioactive cesium dissolved in the filtrate was adsorbed onto an adsorbent, and was recovered. Meanwhile, the residue of the filtrate (solid), though containing water, was 72 g, the radioactivity thereof was 97 Bq, and the radiation intensity thereof was 1,340 Bq/kg. The radiation intensity of the original incineration ash, 45,300 Bq/kg, was lowered to 1,340 Bq/kg, meaning that about 97% of radioactivity contained in the incineration ash was removed.

Example 13

A thermal process was carried out as in Example 12; the substances were naturally cooled over one night, and the temperature and the pressure were brought back to normal temperature and normal pressure. The filtration and water-washing were carried out as in Example 12. As a result, the radiation intensity of the residue of the filtrate (solid content) was 2,984 Bq/kg; about 93% of radioactivity contained in the incineration ash was removed.

Comparative Example 3

Unlike Example 12, a thermal process was not carried out; Comparative Example 3 was carried out to find out how much radioactivity could be reduced only by water washing. 30.6 g of the same incineration ash as that in Example 12 was dispersed in 74.9 g of hot water and stirred; filtration was carried out by using No. 1 filter paper. 16.5 g of hot water was further added to the residue, and was similarly stirred and filtered. The residue had a radioactivity of 325 Bq, and was 46.0 g containing water, and the radiation intensity thereof was 7,065 Bq/kg. Only about 85% of radioactivity of the incineration ash was removed. The water-washed incineration ash was washed with water again in a similar manner; it was found that the radiation intensity did not fall any further.

INDUSTRIAL APPLICABILITY

The present invention can be used to return an environment contaminated with radioactive material to an original state thereof.

EXPLANATION OF REFERENCE SYMBOLS

100: Heating processing device
200: Pressure relief device
300: Condensation device
400: Separation device
500: Adsorption device that uses adsorbent to adsorb radioactive material
600: Vaporization device (concentration device)

The invention claimed is:

1. A process for reducing a radioactive material of an object containing a radioactive material to a safe level in a living environment,
the process comprising:
releasing pressure including carrying out a heating process on an aqueous liquid that includes water, water-soluble liquid, or a mixture of water and water-soluble liquid, and the object in a state where temperature is less than or equal to a critical temperature of the aqueous liquid and pressure is greater than or equal to a saturated vapor pressure of the aqueous liquid when the object is immersed in the aqueous liquid to such a degree that the object is covered or to a greater degree and then abruptly releasing the pressure; and after the releasing pressure, separating a mixture of the object and the aqueous liquid into liquid and solid, the object being at least one selected from the group consisting of an organism, a sewage sludge, a soil and an incineration ash.

2. The process according to claim 1, wherein, before the releasing pressure, the aqueous liquid is added to the object.

3. The process according to claim 1, further comprising: applying an adsorbent to adsorb the radioactive material in a separated liquid.

4. The process according to claim 3, further comprising: when the object includes a plant, carrying out a fermentation process on a liquid from which the adsorbent has been removed.

5. The process according to claim 1, further comprising concentrating the radioactive material by vaporizing a separated liquid content.

6. The process according to claim 5, wherein, at the concentrating the radioactive material, the liquid is frozen.

7. The process according to claim 5, wherein, at the concentrating the radioactive material, the liquid is evaporated under a reduced pressure.

8. The process according to claim 1, wherein at the releasing pressure, after the releasing of pressure, if the pressure cannot be released to a normal pressure, condensing the gaseous aqueous liquid is followed so that an exhaust gas is not discharged to outside.

9. The process according to claim 1, wherein the separating includes filter-pressing at least a part of the solid of the object.

10. The process according to claim 9, further comprising washing with water the solid obtained by the filter-pressing.

11. The process according to claim 9, wherein at least a part of the solid of the object contains fine particles of the solid of the object.

12. The process according to claim 1, wherein the heating process comprises a hydrothermal process, and the abruptly releasing the pressure comprises a blasting process.

13. The process according to claim 12, wherein the blasting process is performed after the hydrothermal process.

14. The process according to claim 1, wherein the heating process comprises a hydrothermal process performed in a range from 240 ° C. to 270 ° C.

15. The process according to claim 1, further comprising: applying an adsorbent to adsorb cesium in the radioactive material which is migrated into the liquid after the heating process.

16. The process according to claim 15, wherein the adsorbent comprises iron ferrocyanide.

17. The process according to claim 1, wherein, in the releasing pressure, vapor is dispersed without being cooled and liquefied.

18. The process according to claim 17, wherein, in the releasing pressure, a part of the radioactive material is dispersed accompanied with the vapor.

19. The process according to claim 1, wherein the abruptly releasing the pressure comprises a blasting process in which water in a liquid state becomes vapor by releasing the pressure by the blasting process.

* * * * *